United States Patent [19]

Leach

[11] 3,898,322

[45] Aug. 5, 1975

[54] ALUMINA HAVING A BINODAL PORE VOLUME DISTRIBUTION

[75] Inventor: Bruce E. Leach, Ponca City, Okla.

[73] Assignee: Continental Oil Company, Ponca City, Okla.

[22] Filed: Dec. 15, 1972

[21] Appl. No.: 315,696

[52] U.S. Cl. ............... 423/628; 423/630; 423/625; 252/463
[51] Int. Cl. .............................................. C01f 7/02
[58] Field of Search.................... 423/625, 630, 628

[56] References Cited
UNITED STATES PATENTS 3,264,063   8/1966   Carter................................. 423/630
3,417,028   12/1968  Montgomery et al. ......... 423/628 X
3,419,352   12/1968  Acciani............................... 423/630

*Primary Examiner*—Herbert T. Carter
*Attorney, Agent, or Firm*—F. Lindsey Scott

[57] ABSTRACT

Alpha alumina monohydrate having a cumulative pore volume from about 1.0 to about 3.0 cc/g wherein from about 20 to about 40 percent of said cumulative pore volume consists of pores having a pore diameter from about 40 to about 100 A and wherein from about 20 to about 40 percent of said cumulative pore volume consists of pores having a pore diameter from about 250 to about 800 A and a method for preparing such alumina.

5 Claims, 3 Drawing Figures

ALUMINA HAVING A BINODAL PORE VOLUME DISTRIBUTION

FIELD OF THE INVENTION

This invention relates to alumina. This invention further relates to alumina having a binodal pore volume distribution. This invention further relates to alumina having a binodal pore volume distribution and a method for preparing such alumina.

PRIOR ART

Numerous processes, such as the water hydrolysis of aluminum alkoxide, the alum process, and sodium aluminate processes, are known for the production of alumina. Such alumina has a variety of uses, such as for catalysts, catalyst supports, and the like. In many of these applications, the usefulness of the alumina is directly related to the pore volume, surface area, and density. Generally, lighter alumina having low bulk density, high surface area and high porosity is more desirable. Most processes produce alumina having a loose bulk density greater than about 35 $lb/ft^3$, a pore volume of less than about 0.6 cc/g, and a surface area lower than about 275 $m^2/g$. Recently, it has been discovered that alumina slurry produced by the water hydrolysis of aluminum alkoxide; the alum process and sodium aluminate processes may be contacted with an effective amount of an organaic solvent having a lower surface tension than water to form a solvent-aqueous alumina mixture and dried to produce an alumina having a loose bulk density of about 7.5 to about 25 $lb/ft^3$, a surface area of about 275 to 400 $m^2/g$ and a pore volume of from about 1 to about 2.75 cc/g. Such alumina is very desirable in catalytic applications and the like.

Even though the alumina having such properties is desirable as a catalyst, catalyst support, and the like, it has been observed that the pore volume is rather evenly distributed, and it has been postulated that for a number of liquid-phase reactions, a catalyst support having a large number of both small pores and large pores may be very desirable. Some applications for which such catalysts would be desirable are the demetalization of hydrocarbon feedstocks, hydrodesulfurization, and the like.

As a result, much time and effort has been directed to the development of an alumina having a large number of small pores and a large number of larger pores.

OBJECTS OF THE INVENTION

It is the object of the present invention to provide an alumina having a high proportion of the cumulative pore volume in small pores and a high proportion of the cumulative pore volume in larger pores. It is a further objective of the present invention to provide a method for producing such alumina.

SUMMARY OF THE INVENTION

It has been discovered that the objectives of the present invention are achieved in alpha alumina monohydrate having a cumulative pore volume (0–10,000 A) from about 1.0 to about 3.0 cc/g, wherein from about 20 to about 40 percent of the cumulative pore volume consists of pores having a pore diameter from about 40 to about 100 A and wherein from about 20 to about 40 percent of said cumulative pore volume consists of pores having a pore diameter from about 250 to about 800 A. Such alumina is produced by a process comprising hydrolyzing solid aluminum alkoxides with water at a pH from about 4 to about 10 to produce aqueous alumina slurry and alcohol, contacting the aqueous alumina slurry with an effective amount of an organic solvent, having a lower surface tension than water, and drying to produce the desired alumina product.

DESCRIPTION OF PREFERRED EMBODIMENTS

Figure 1:
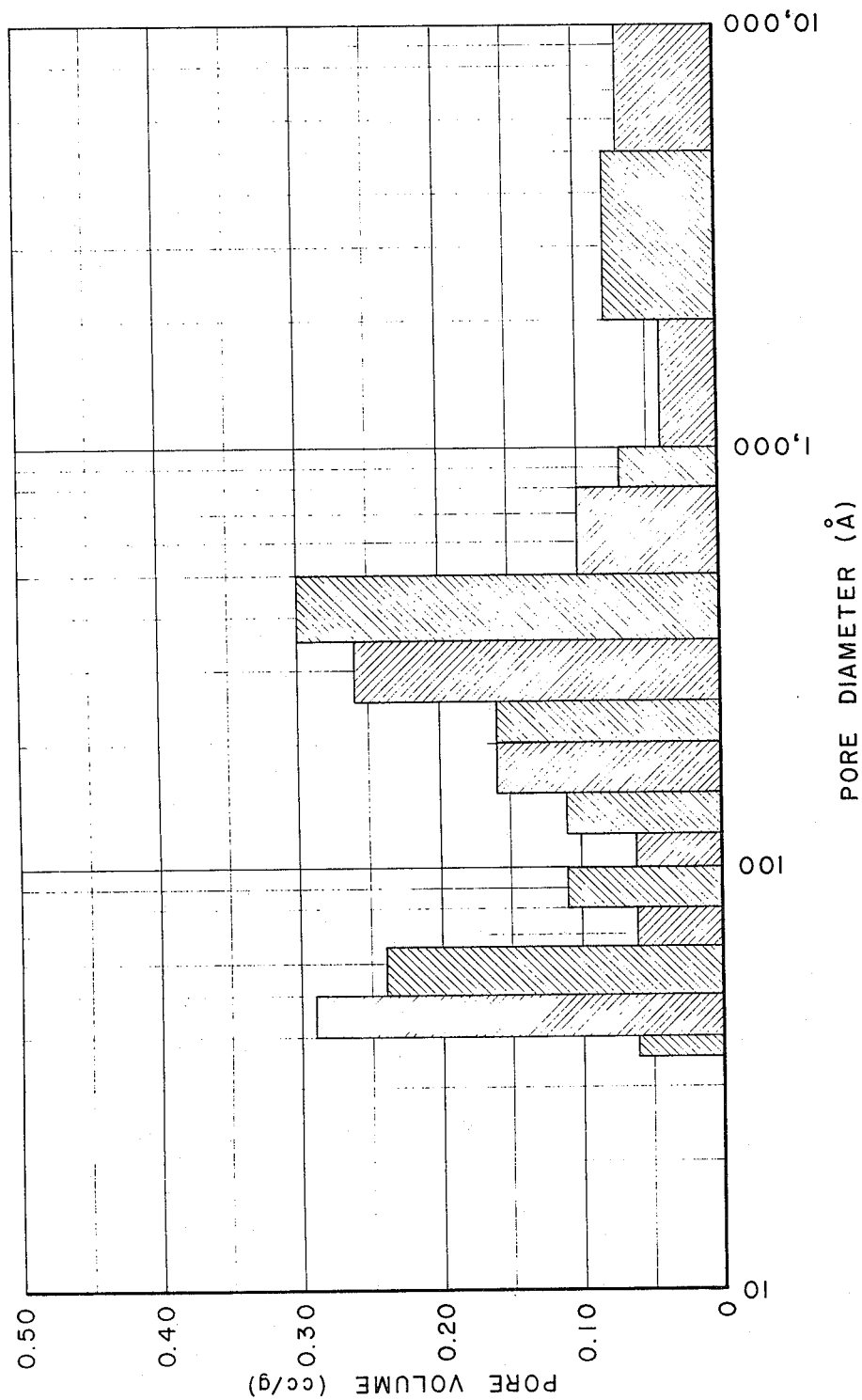
FIG. 1 shows the pore volume distribution of the alumina produced in Example 1.

Alpha alumina monohydrate, having a cumulative pore volume (0–10,000 A) from about 1.0 to about 3.0 cc/g, wherein from about 20 to about 40 percent of the cumulative pore volume consists of pores having a pore diameter from about 40 to about 100 A and wherein from about 20 to about 40 percent of the cumulative pore volume consists of pores having a pore diameter from about 250 to about 800 A is useful as catalyst, catalyst support, and the like. While such alumina is desirable and useful as a catalyst, catalyst support, and the like, preferred aluminas are those having a cumulative pore volume of about 1.5 to about 2.5 cc/g, wherein from about 20 to about 35 percent of the cumulative pore volume consists of pores having a pore diameter from about 40 to about 100 A and wherein from about 25 to about 40 percent of the cumulative pore volume consists of pores having a pore diameter from about 250 to about 800 A. The more desirable aluminas are those having a cumulative pore volume from about 1.5 to about 2.5 cc/g, wherein from about 25 to about 35 percent of the cumulative pore volume consists of pores having a pore diameter from about 40 to about 80 A and wherein from about 30 to about 40 percent of the cumulative pore volume consists of pores having a pore diameter from about 250 to about 800 A.

Such alumina is produced by a process comprising hydrolyzing solid aluminum alkoxides with water at a pH from about 4 to about 10 to produce an aqueous alumina slurry and alcohol, contacting the aqueous alumina slurry with an effective amount of an organic solvent, having a lower surface tension than water, and drying to produce alumina.

Aluminum alkoxides generally are suitable for use in the process of present invention; however, preferred aluminum alkoxides are those produced by the Ziegler process wherein the alkoxide groups, each of which contains from about 1 to about 30 carbon atoms.

In the practice of the present invention, it has been observed that most desirable results are achieved when the pH is from about 4 to about 6. The pH in the hydrolysis reaction may, of course, be adjusted by means well known to those skilled in the art, such as the addition of alkaline or acidic material such as ammonium hydroxide, inorganic and organic acids, and the like.

It is usually necessary to separate the aqueous alumina slurry and the alcohol by means well known to those skilled in the arts, such as filtration, centrifugation, and the like, and in addition, other steps may be employed to result in more complete separation of the aqueous alumina slurry and the produced alcohols. In some instances where the alcohol produced has a low molecular weight, it may not be necessary to separate the aqueous alumina slurry and the alcohol.

The aqueous alumina slurry is contacted with an effective amount of an organic solvent and dried to produce the desired alumina product. A process for contacting aqueous alumina slurries with organic solvents to produce alumina having higher surface areas, lower loose bulk densities, and higher pore volumes is disclosed in U.S. Ser. No. 246,028 entitled "High Porosity, High Surface Area, Low Bulk Density Alumina," filed Apr. 20, 1972, by W. C. Ziegenhain. Suitable organic solvents are selected from the group consisting of acetone, methanol, ethanol, propanol, isopropanol, butanol, isobutanol, and tertiary butanol, and desirably, the organic solvent is present in an amount sufficient to form an azeotropic mixture with the water present so that upon drying, the water is removed azeotropically.

It has further been found that most desirable results are achieved when the aqueous alumina slurry is aged after hydrolysis for at least two hours. It is preferred that the aqueous alumina slurry be aged for at least 24 hours, although desirable results have been obtained wherein the aqueous alumina slurry was aged from about 2 to about 60 hours.

The alumina product of the present invention may be extruded to produce extrudates having a cumulative pore volume from about 1.5 to about 3.0 cc/g wherein from about 20 to about 35 percent of the cumulative pore volume consists of pores from about 40 to about 80 A in diameter and wherein from about 25 to about 35 percent of the cumulative pore volume consists of pores from about 250 to about 800 A in diameter. Such extrudates may be produced by methods well known in the art, such as the methods disclosed in U.S. Ser. No. 268,246 entitled "Low Density, High Porosity Alumina Extrudates and the Methods for Producing Said Extrudates" filed July 3, 1972, by Leach et al. Such extrudates may, of course, be impregnated with catalytic metal elements and the like to produce catalysts, catalyst supports, and the like. Such modifications are well known to those skilled in the art, and no further discussion is believed necessary.

It will be observed that in the alumina product produced by the process of the present invention, a high proportion of the total cumulative pore volume is present in the form of pores having a small diameter, and a significant proportion of the cumulative pore volume is present as pores having a relatively large pore diameter.

It is pointed out that the foregoing description of preferred embodiments is illustrative in nature and should not be considered as limiting. In fact it is expected that upon a review of the foregoing description of preferred embodiments and the appended examples and claims, many variations and modifications within the scope of the present invention may appear obvious and desirable to those skilled in the art.

EXAMPLE 1

Aluminum isopropoxide (1 mole, 204 grams) was added to 1 liter of water at 25°C which contained 1 gram of citric acid. The hydrolysis reaction was essentially complete in a few hours, but the alumina was allowed to age at room temperature for 60 hours. The alumina was filtered and washed twice with 1 liter portions of anhydrous isopropanol before drying. The alumina had the following properties:

| | |
|---|---|
| Loose bulk density | 14.6 lb/ft$^3$ |
| Surface area | 386 m$^2$/g |
| Thermogravimetric analysis | 8 percent beta trihydrate, 92 percent alpha monohydrate |
| Cumulative pore volume | 2.08 cc/g |

| Pore Volume Distribution | | |
|---|---|---|
| Pore Diameter A | | Cumulative Pore Volume cc/g |
| 0 – | 35 | 0.01 |
| 0 – | 40 | 0.07 |
| 0 – | 50 | 0.36 |
| 0 – | 65 | 0.50 |
| 0 – | 80 | 0.56 |
| 0 – | 100 | 0.67 |
| 0 – | 120 | 0.73 |
| 0 – | 150 | 0.84 |
| 0 – | 200 | 1.00 |
| 0 – | 250 | 1.16 |
| 0 – | 350 | 1.42 |
| 0 – | 500 | 1.72 |
| 0 – | 800 | 1.82 |
| 0 – | 1,000 | 1.89 |
| 0 – | 2,000 | 1.93 |
| 0 – | 5,000 | 2.01 |
| 0 – | 10,000 | 2.08 |

The pore volume distribution is shown graphically in FIG. 1, and it will be observed that a high proportion of the cumulative total pore volume is in the form of pores having a pore diameter from about 40 to about 70 A, and a significant proportion of the total cumulative pore volume consists of pores having a pore diameter from about 250 to about 800 A.

EXAMPLE 2

Aluminum alkoxides produced by the Ziegler process were hydrolyzed at 200°F in the presence of 0.25 weight percent ammonia. The alumina slurry was separated from the alcohols and contacted with an azeotropic amount of normal butanol and dried. The resulting alumina had a pore volume distribution as shown below:

| Pore Volume Distribution | | |
|---|---|---|
| Pore Diameter A | | Cumulative Pore Volume cc/g |
| 0 – | 40 | 0.01 |
| 0 – | 50 | 0.05 |
| 0 – | 65 | 0.28 |
| 0 – | 80 | 0.48 |
| 0 – | 100 | 0.62 |
| 0 – | 120 | 0.70 |
| 0 – | 150 | 0.80 |
| 0 – | 200 | 0.91 |
| 0 – | 250 | 1.01 |
| 0 – | 350 | 1.16 |
| 0 – | 500 | 1.32 |
| 0 – | 800 | 1.46 |
| 0 – | 1,000 | 1.57 |
| 0 – | 2,000 | 1.71 |
| 0 – | 5,000 | 1.93 |
| 0 – | 10,000 | 2.17 |

Figure 2:
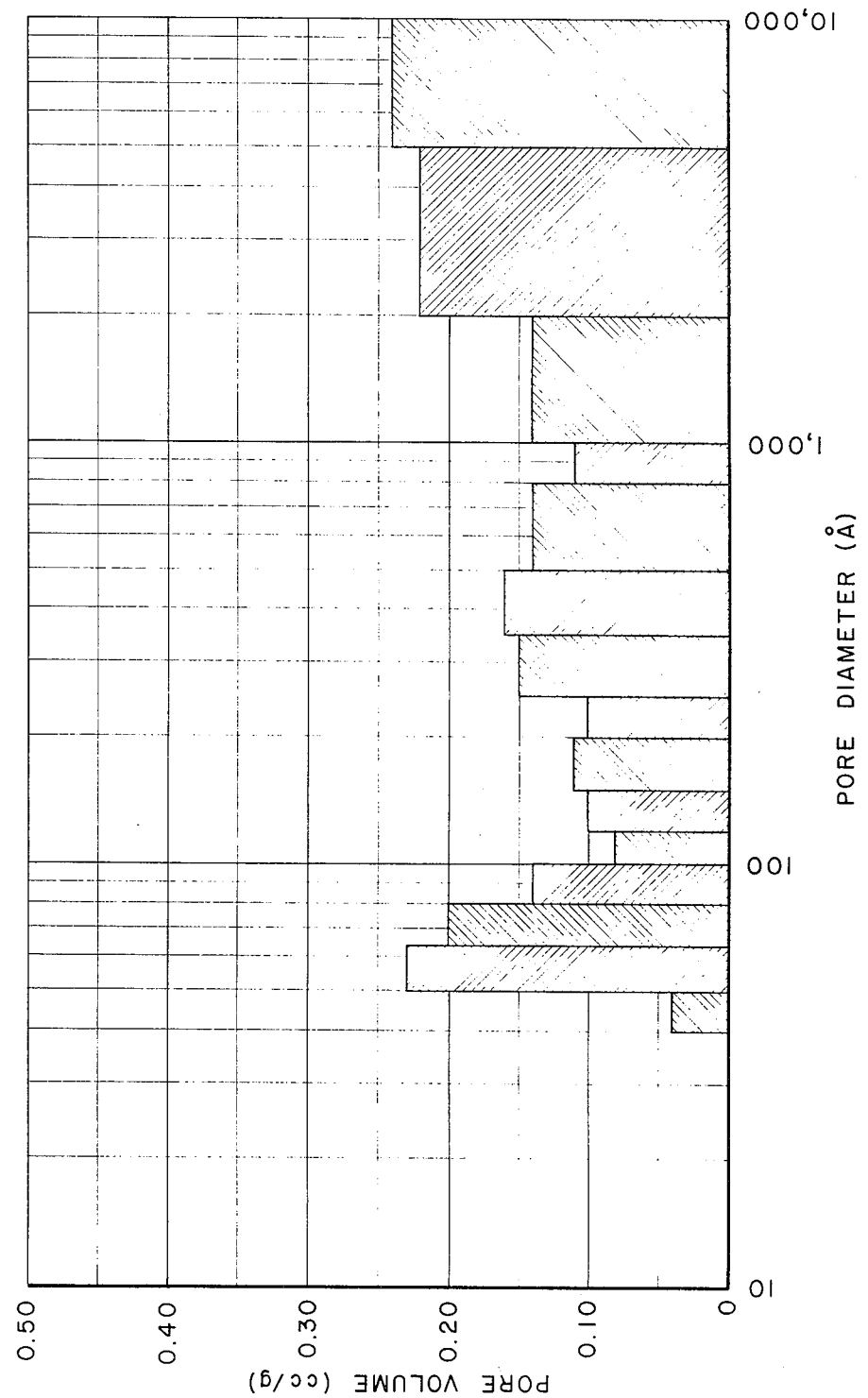
FIG. 2 shows the pore volume distribution of the alumina produced in Example 2.

The pore volume distribution is shown in tabular form in FIG. 2, and it will be observed that the unusual binodal pore volume distribution shown in Example 1 is not present.

EXAMPLE 3

Example 1 was repeated except that the hydrolysis aging time was shortened to 24 hours. The alumina product had the following properties:

| | |
|---|---|
| Loose bulk density | 12.5 lb/ft$^3$ |
| Surface area | 363 m$^2$/g |
| Cumulative pore volume | 2.03 cc/g |

| Pore Volume Distribution | |
|---|---|
| Pore Diameter A | Cumulative Pore Volume cc/g |
| 0 – 35 | 0.01 |
| 0 – 40 | 0.04 |
| 0 – 50 | 0.25 |
| 0 – 65 | 0.44 |
| 0 – 80 | 0.51 |
| 0 – 100 | 0.58 |
| 0 – 120 | 0.62 |
| 0 – 150 | 0.70 |
| 0 – 200 | 0.81 |
| 0 – 250 | 0.89 |
| 0 – 350 | 1.07 |
| 0 – 500 | 1.26 |
| 0 – 800 | 1.62 |
| 0 – 1,000 | 1.77 |
| 0 – 2,000 | 1.88 |
| 0 – 5,000 | 1.99 |
| 0 – 10,000 | 2.03 |

Figure 3:
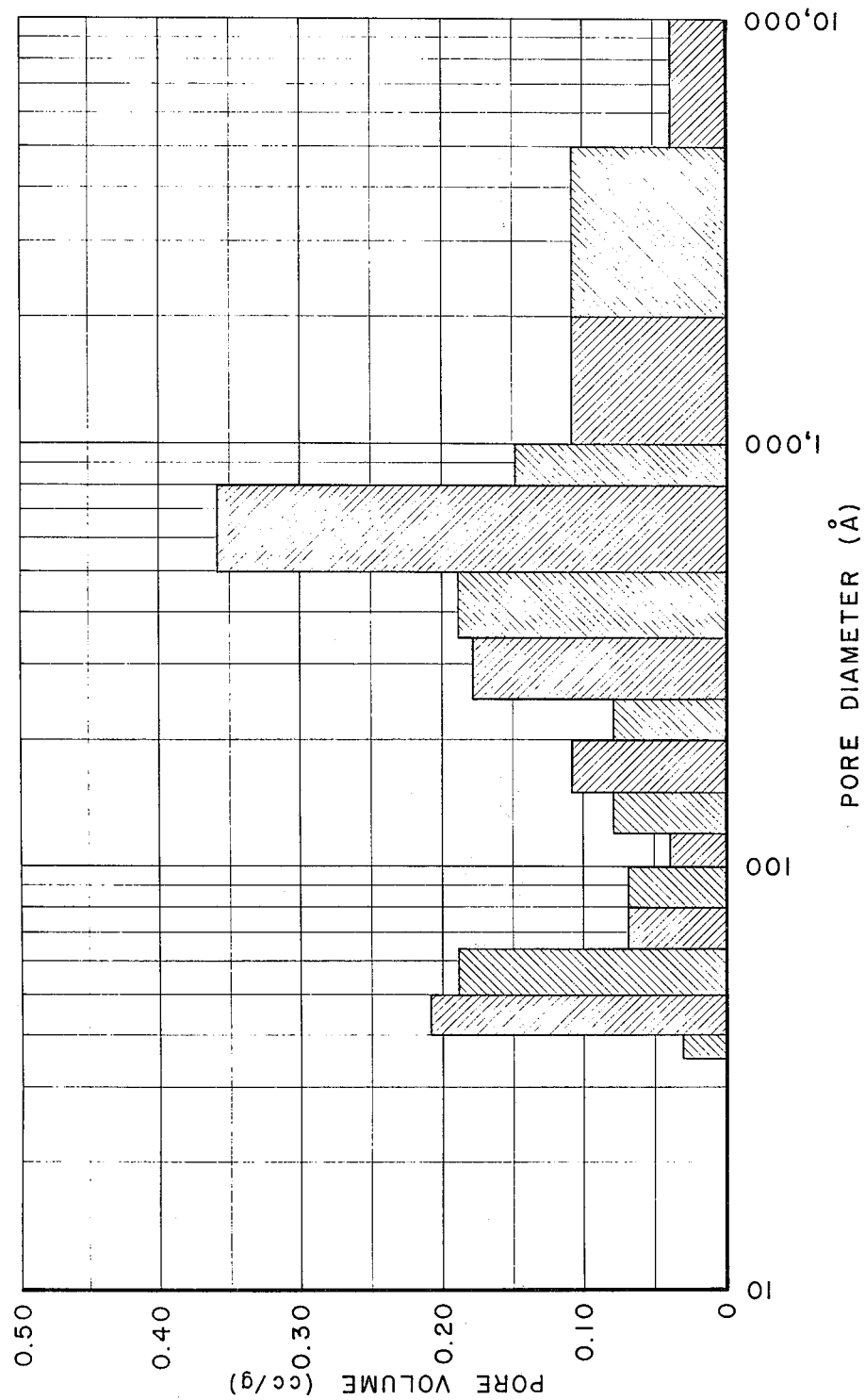
FIG. 3 shows the pore volume distribution of the alumina produced in Example 3.

The pore volume distribution is shown graphically in FIG. 3, and it will be observed that again a significant proportion of the pore volume is found in pores having a pore diameter from 40 to 80 A, and a second significant proportion of the pore volume is found in pores having a diameter from about 250 to about 100 A.

It is thus shown that the process of the present invention results in an alumina which has a novel binodal pore volume distribution which is desirable for catalytic applications.

EXAMPLE 4

The alumina produce from Example 1 was pelleted and compared with an extrudate of the alumina product of Example 2.

| | Pore Volume Distribution | |
|---|---|---|
| | Cumulative Pore Volume | |
| Pore Diameter | cc/g Pellet | cc/g Extrudate |
| 0 – 35 | 0.01 | 0.01 |
| 0 – 40 | 0.07 | 0.04 |
| 0 – 50 | 0.10 | 0.06 |
| 0 – 65 | 0.22 | 0.16 |
| 0 – 80 | 0.49 | 0.40 |
| 0 – 100 | 0.72 | 0.60 |
| 0 – 120 | 0.81 | 0.72 |
| 0 – 150 | 0.89 | 0.80 |
| 0 – 200 | 1.00 | 0.86 |
| 0 – 250 | 1.08 | 0.90 |
| 0 – 350 | 1.18 | 0.94 |
| 0 – 500 | 1.24 | 0.98 |
| 0 – 800 | 1.28 | 1.02 |
| 0 – 1,000 | 1.29 | 1.05 |
| 0 – 2,000 | 1.33 | 1.12 |
| 0 – 5,000 | 1.40 | 1.30 |
| 0 – 10,000 | 1.43 | 1.30 |

It is recognized that many of the steps included in the method of the present invention are well known to those skilled in the art, and no novelty is claimed in such steps. The novelty in the present method lies in the combination of the steps in the particular manner shown to produce an unusual and unexpected alumina product having a binodal pore volume distribution.

Having thus described the invention, I claim:

1. A method for producing alpha alumina monohydrate having a cumulative pore volume 0–10,000A from about 1.0 to about 3.0 cc/g wherein from about 20 to about 40 percent of said cumulative pore volume consists of pores having a pore diameter from about 40 to about 100 A and wherein from about 20 to about 40 percent of said cumulative pore volume consists of pores having a pore diameter from about 250 to about 800 A, said method consisting essentially of sequentially:
   a. hydrolyzing solid aluminum alkoxides with water having a pH from about 4 to about 10 to produce an aqueous alumina slurry and alcohol,
   b. mixing said aqueous alumina slurry with an organic solvent selected from the group consisting of acetone, methanol, ethanol, propanol, isopropanol, butanol, isobutanol and tertiary butanol in an amount sufficient to form an azeotropic mixture with the water present in said aqueous alumina slurry to form a solvent-aqueous alumina mixture and
   c. drying said mixture to produce said alpha alumina monohydrate.

2. The method of claim 1 wherein said pH is from about 4 to about 6.

3. The method of claim 1 wherein aqueous alumina slurry is aged after hydrolysis for at least 2 hours.

4. The method of claim 3 wherein said aqueous alumina slurry is aged from about 2 to about 60 hours.

5. The method of claim 1 wherein said aqueous alumina slurry is aged after hydrolysis for at least 24 hours.

* * * * *

UNITED STATES PATENT OFFICE
CERTIFICATE OF CORRECTION

PATENT NO. : 3,898,322

DATED : August 5, 1975

INVENTOR(S) : Bruce E. Leach

It is certified that error appears in the above-identified patent and that said Letters Patent are hereby corrected as shown below:

Column 2, line 34, "The more" should be changed to read -- The most -- .

Column 2, line 53, between the words "alkoxide" and "group" the words -- portion of the alumina alkoxide consists of alkoxide -- should be inserted.

Signed and Sealed this twenty-third Day of March 1976

[SEAL]

Attest:

RUTH C. MASON
Attesting Officer

C. MARSHALL DANN
Commissioner of Patents and Trademarks